United States Patent Office 3,344,063
Patented Sept. 26, 1967

3,344,063
DRILLING FLUIDS AND ADDITIVES THEREFOR
Charles A. Stratton, Copan, Okla., assignor to Phillips Petroleum Company, a corporation of Delaware
No Drawing. Filed Sept. 30, 1965, Ser. No. 491,837
15 Claims. (Cl. 252—8.5)

This application is a continuation-in-part of my copending application Ser. No. 258,888, filed Feb. 15, 1963, now abandoned.

This invention relates to drilling fluids and additives therefor. In one aspect this invention relates to drilling fluids having improved water loss properties and/or improved viscosity or other rheological characteristics. In another aspect this invention relates to an additive for drilling fluids and a process for making same, which additive when incorporated in a drilling fluid imparts improved water loss properties and/or viscosity or other rheological characteristics to said drilling fluid.

In the art of drilling wells to tap subterranean deposits of fluids such as oil and/or gas, especially when drilling by the rotary method employing a rotary bit and drill stem, a drilling fluid, usually a compounded fluid made to predetermined physical and chemical properties, is circulated to the bottom of the bore hole, out through openings in the bit at the bottom of the bore hole, and then back up said bore hole to the surface by passage through the annular space between said drill stem and the wall of said bore hole (or between said drill stem and the wall of the casing where casing has been put in place).

The drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; and it must serve as a weighting material exerting sufficient pressure to counterbalance any pressure exerted by water, gas, oil, or other fluid from a penetrated structure and to prevent caving or other intrusion into the drill hole.

These requirements have been met in the past by employing both aqueous or water base and non-aqueous or oil base drilling fluids. The aqueous drilling fluids normally comprise water, and finely divided inorganic materials such as various types of clays and clayey materials, and may also contain weighting materials, all suspended in the water. The non-aqueous or oil base drilling fluids normally comprise a non-aqueous liquid such as crude oil or a petroleum distillate, and a weighting material which can be a clay or other suitable material. In addition to aqueous and non-aqueous drilling fluids as defined above, emulsion-type drilling fluids are often used. These emulsion drilling fluids normally comprise a substantially water-insoluble liquid such as oil, a finely divided inorganic material such as clay, and water, together with a suitable dispersing or emulsifying agent. The two types of emulsion drilling fluids are the oil-in-water emulsion type, sometimes referred to as water base emulsion type, and the water-in-oil emulsion type, sometimes referred to as oil base emulsion type. In the latter, oil forms the continuous phase of the emulsion, and in the former, water or brine forms the continuous phase of the emulsion.

In the drilling of wells there are major difficulties caused by natural formations penetrated. One of these difficulties is the encountering of certain formations, such as gypsum, which will "cut" the drilling mud so that the clay particles are flocculated and the viscosity becomes too high. In such instances there is danger of the drill pipe twisting in half, or of gas cutting of the mud, or of a blowout occurring due to the cutting of the mud. Another difficulty is the encountering of formations known as heaving shale. A heaving shale absorbs water from the drilling mud and by a caving or disintegrating action common to clay and shale, or by a swelling action common to bentonite materials, the well hole is closed around the drill string, choking off the circulation of drilling mud and often seizing the drill string so that it cannot be rotated or twists in half. Another difficulty which is frequently encountered in deeper wells is gelation and/or thickening of the drilling mud due to the higher temperatures encountered in said deeper wells. In such instances the drilling mud actually gels and/or thickens, greatly increasing the pump pressures required for circulating the drilling mud. In severe cases it becomes practically impossible to properly circulate the mud. Furthermore, said high temperature gelation is frequently aggravated by the presence of contaminants such as gypsum, salt, cement, etc., in the drilling mud. Thus, another requirement for drilling muds is that they be characterized by stability at the higher temperatures encountered in deeper wells.

I have now discovered a new class of additives for drilling fluids, which additives when incorporated in aqueous drilling fluids, e.g., water base drilling fluids and oil-in-water emulsion drilling fluids, impart enhanced water loss properties and/or enhanced viscosity or other rheological characteristics to said drilling fluids. Said new additives are metal complexes of sulfoalkylated tannin.

Thus, broadly speaking, the present invention resides in said new additives; methods for preparing said new additives; drilling fluids containing one or more of said new additives; and methods of using said drilling fluids in the drilling of wells.

Thus, an object of this invention is to provide an improved drilling fluid. Another object of this invention is to provide an improved drilling fluid having enhanced water loss properties and/or enhanced viscosity or other rheological characteristics. Another object of this invention is to provide improved aqueous drilling fluids which are characterized by stability to the high temperatures encountered in drilling deep wells. Another object of this invention is to provide new additives for use in aqueous drilling fluids, e.g., water base drilling fluids and oil-in-water emulsion drilling fluids, which additives will impart enhanced water loss properties and/or enhanced viscosity or other rheological characteristics to said drilling fluids. Another object of this invention is to provide methods of preparing said new drilling fluid additives. Another object of this invention is to provide methods of using said improved drilling fluids in the drilling or workover of wells. Other aspects, objects, and advantages of the invention will be apparent to those skilled in the art in view of this disclosure.

Thus, according to the invention, there is provided an aqueous well drilling fluid comprising: water; sufficient finely divided solids to form a filter cake on the wall of the well; and an amount of a metal complex of a sulfoalkylated tannin sufficient to reduce at least one of (a) the water loss due to filtration through said filter cake, (b) the yield point, and (c) the 10-minute gel, but insufficient to increase the viscosity of said drilling fluid to such an extent that it cannot be circulated; said metal being selected from the group consisting of iron, copper, chromium, nickel, cobalt, manganese, zinc, aluminum, titanium, and vanadium.

Further according to the invention, there is provided an aqueous well drilling fluid comprising a mixture containing: water; sufficient suspended finely divided solids to form a filter cake on the wall of the well; and an amount of a metal complex of a sulfoalkylated tannin sufficient to reduce the water loss due to filtration through said filter cake but insufficient to increase the viscosity of said drilling fluid to such an extent that it cannot be circulated; said metal complex having been prepared by the inter-reaction, in an alkaline aqueous reaction medium under reaction conditions, between a tannin compound, a carbonyl compound selected from the group consisting of the lower molecular weight aldehydes and ketones, a sulfur compound selected from the group consisting of sulfurous acid and water-soluble salts thereof, and a metal compound selected from the group consisting of the hydroxides and water soluble salts of iron, copper, chromium, nickel, cobalt, manganese, zinc, aluminum, titanium, and vanadium.

Further according to the invention, there are provided methods of using the improved well drilling fluids of the invention, which methods comprise circulating said well drilling fluids into and from the bore hole in contact with the walls of said bore hole.

Still further according to the invention, there are provided as new compounds, metal complexes of sulfoalkylated tannins, and methods of preparing same, as discussed further hereinafter.

The metal complexes of sulfoalkylated tannins which are the new additives of the invention are preferably those which are soluble in the water phase of the drilling fluid. However, as discussed further hereinafter, the invention is not limited to the metal complexes of sulfoalkylated tannins which are completely soluble in water. It is sufficient if said metal complexes can be readily dispersed in the water phase of the drilling fluids in any suitable manner.

Examples of metal compounds which can be used in the preparation of the metal complexes of the invention, include, among others, the water-soluble salts such as the nitrate or chloride, and the hydroxides or hydrated oxides of iron, copper, chromium, nickel, cobalt, manganese, zinc, aluminum, titanium, and vanadium. Generally speaking, the water-soluble salts are preferred. However, the hydrated oxides or hydroxides of said metals are sometimes preferred compounds for use in the practice of the invention because they contain no anions such as chloride or nitrate which would be left in the reaction mixture when the cation is complexed with the tannin. Another preferred class of metal-containing compounds which can be used in the practice of the invention are the ammonium and the alkali metal salts of the above metals wherein the said above metals are present in the anion portion of the molecule, e.g., the alkali metal chromates, vanadates, titanates, manganates, etc., and the alkali metal dichromates. As used herein and in the claims, unless otherwise specified, the term alkali metal is employed generically to include sodium, potassium, lithium, rubidium, cesium, and ammonium.

Tannins which can be used in preparing the metal complexes of sulfoalkylated tannins in accordance with the invention are the vegetable tannins, including both the gallotannins and the flavotannins, (sometimes called catechol tannins). Thus, the word "tannin" as used herein and in the claims, unless otherwise specified, refers to and includes the vegetable gallotannins and the vegetable flavotannins. Examples of the gallotannins include: tannic acid or Chinese tannin, Turkish tannin, Hamamelis tannin, Acer-tannin, Glucogallin, sumac tannin, Valonia oak gall tannin, tea tannin, tara, myrabolam, divi-divi, algarobilla, oak, and chestnut. Examples of flavotannins include: gambier and catechu or Burma cutch, quebracho, Tizerah, urunday, wattle, mangrove, spruce, hemlock, larch, willow, and avaram. Said flavotannins are the preferred tannins for use in the practice of the invention.

Quebracho is the presently most preferred tannin for use in the practice of the invention. Quebracho is extracted from the bark and wood of the quebracho tree with water. The conventional method of preparing quebracho is to disintegrate the wood and bark, extract the bark and/or wood with water, the solution of quebracho and water is evaporated to 85 percent concentration of quebracho and the concentrated quebracho is spray dried. Quebracho is the commercial catechol tannin or flavotannin product. The high tannin content (about 20 percent) of the wood of the quebracho tree makes it the important source of catechol tannins. The principal source of gallotannins is gall nuts.

The metal complexes of sulfoalkylated tannin, either a gallotannin or a flavotannin, can be prepared by several different procedures, all in accordance with the invention. All of said procedures involve the inter-reaction, in an alkaline aqueous reaction medium under reaction conditions, between a tannin compound, a carbonyl compound selected from the group consisting of aldehydes and ketones, a sulfur compound selected from the group consisting of sulfurous acid and water-soluble salts thereof, and a metal compound selected from the group consisting of the hydrated oxides or hydroxides and the water-soluble salts of iron, copper, chromium, nickel, cobalt, manganese, zinc, aluminum, titanium, and vanadium. Thus, in one method in accordance with the invention, an alkali metal hydroxide, e.g., sodium hydroxide, an aldehyde or ketone, e.g., formaldehyde or acetone, a sulfite, e.g., sodium sulfite or sodium bisulfite, a tannin, e.g., quebracho (quebracho extract), and a suitable metal compound, e.g., ferric hydroxide, are added to water in a reaction vessel to form a reaction mixture. The sequence of adding said reactants to the water is not critical. However, it is sometimes preferred to add the alkali metal hydroxide first. The amount of alkali metal hydroxide employed will be an amount sufficient to make the reaction mixture alkaline, at least initially. Said reaction mixture is then maintained under conditions of time and temperature sufficient to cause the substantial conversion of the tannin compound into a metal complex of sulfoalkylated tannin.

If desired, the carbonyl compound, e.g., formaldehyde or acetone, and the sulfite can be prereacted. Thus, in one method, for example, a solution containing formaldehyde and sodium sulfite is prepared separately and then combined with the other reactants in the alkaline reaction medium.

In one preferred method for preparing the metal complexes of the invention, an alkaline first solution is prepared by dissolving a tannin (such as quebracho extract), and an alkali metal hydroxide (such as sodium hydroxide) in water. A second solution is formed by admixing a carbonyl compound (such as formaldehyde) and a sulfite (such as sodium bisulfite) in water. Said second solution is then added to said first solution to form a third solution. Said third solution is then maintained at an elevated temperature for a period of time sufficient for at least a substantial portion of said aldehyde and said sulfite to react with said tannin to form a sulfoalkylated tannin. A metal compound (such as ferric hydroxide) is then added to said third solution and reacted with the sulfoalkylated tannin therein to form a metal complex of sulfoalkylated tannin which is recovered from the resulting reaction mixture. In this instance, using the exemplary reactants mentioned above, the product is an iron complex of sulfomethylated quebracho.

In another preferred method for preparing the metal complexes of the invention, the desired amount of water is added to a reactor vessel equipped with suitable stirring means. The desired amount of carbonyl compound (such as formaldehyde) is then added to said water with stirring. The desired amount of a sulfite (such as sodium bisulfite) is then added to the water, with stirring, and the carbonyl compound and sulfite are permitted to react to completion. Usually the reaction time will be within the range of 0.5 to 3 hours and the final temperature will be in the order of 125° F., depending upon the initial ambient temperature of the water, the amount of reagents, etc. The desired amount of an alkali metal hydroxide (such as sodium hydroxide) is then added. The tannin compound (such as quebracho) is then added to the tank containing the above reagents with vigorous stirring. Heating is initiated and the solution is maintained at an elevated temperature which is preferably within the range of 180 to 200° F. for a period of from 1 to 6 hours. The desired amount of a metal compound is then added to the solution of sulfoalkylated tannin and reacted therewith to form a metal complex of sulfoalkylated tannin. It is not necessary to add additional heat to the reactant solution during the addition of the metal compound. The residual heat remaining from dissolving the tannin compound will usually be sufficient. After the sulfoalkylation reaction is complete the metal complex of sulfoalkylated tannin is recovered from the reaction solution in any suitable manner, such as by drum drying or spray drying.

If desired, the metal can be complexed with the tannin compound first. In this method, the metal compound is added to an alkaline solution of the tannin to form the metal complex of said tannin. Said metal complex is then sulfoalkylated by adding the carbonyl compound and sulfite, either prereacted or not prereacted, to the solution of the metal complex of the tannin to sulfoalkylate said metal complex and form a metal complex of sulfoalkylated tannin.

In all of the above methods for preparing the additives of the invention, the metal complexes of sulfoalkylated tannin can be recovered from the reaction mixture by any suitable method such as evaporation, drum drying, spray drying, etc. It is not essential to recover said metal complexes of sulfoalkylated tannin from the reaction mixture. Said reaction mixture can be used per se in liquid form in the drilling fluids of the invention. However, it is preferred to recover and dry said metal complex products. The dried solids can then be bagged and shipped to the field for use in the drilling muds described herein.

The vegetable tannins are high molecular weight materials having molecules of complex structure containing phenolic hydroxyl groups. Some authorities consider said tannins to be mixtures of polyphenolic substances. So far as is known all of said tannins contain at least one aromatic (e.g., benzene) ring having at least one phenolic hydroxyl group attached thereto. Said hydroxyl groups have their hydrogen atoms replaced in alkaline solution. It is believed the hydroxyl groups furnish at least a portion of the reactive sites for complexing an atom of a metal such as iron with the tannin molecule. The reactive sites remaining on the aromatic ring structure are susceptible to sulfoalkylation to add side chain(s) to the tannin molecule.

Due to the complex nature and chemistry of the tannin compounds it is not intended to limit the invention to the above or to any specific reaction mechanism, or to any specific method for preparing the additives of the invention. However, said additives of the invention can be conveniently described in terms of processes for their manufacture. One reaction mechanism by which the product additives of the invention can be formed is as follows. Two reactions, which can be carried out simultaneously or in any order, are involved, (1) a metal complexing reaction whereby an atom of the metal involved complexes with one, two, or three tannin molecules and (2) a sulfoalkylation reaction whereby the tannin molecule is alkylated by one or more sulfoalkylene radicals attached to said tannin molecule as side chains. The alkylene portion of said sulfoalkylene radical is a methylene or substituted methylene group. Thus, said side chain(s) can be represented by the formula $-C(R)_2-SO_3M$ wherein each R is selected from the group consisting of a hydrogen atom and alkyl, cycloalkyl, aryl, and alkaryl radicals, and M is ammonium or an alkali metal depending upon the particular sulfite employed. As indicated hereinafter, it is preferred when R is other than hydrogen, that said R be an alkyl group containing from 1 to 5 carbon atoms.

As indicated above, the reactions involved in the preparation of the additives of the invention are carried out in an alkaline aqueous medium. Hydroxides of the alkali metals sodium, potassium, lithium, rubidium, and cesium can be used to make said medium alkaline. The amounts of said hydroxides used can be varied over a wide range. The principal function of said hydroxide is to impart sufficient initial solubility to the raw tannin so that it can react with the sulfite and aldehyde or ketone reactants and the metal compound in the sulfoalkylation and metal complexing reactions. In order to obtain practical reaction rates for said reactions, the pH of the reaction medium should be about 10. In any event, enough of the hydroxide is used to make the initial pH of the reaction medium at least 7, and preferably 10 to 13. However, large excesses of the hydroxide above the amount required to initially solubilize the raw tannin should be avoided for best results. After the tannin has been sulfoalkylated it is not necessary that the reaction medium be alkaline. Depending upon the particular metal compound used to supply the complexing metal, the final reaction mixture can have a pH of less than 7. When sulfurous acid and a bisulfite is used as the sulfur compound, sufficient hydroxide should be present to convert these to the sulfite form. If desired, the alkali metal hydroxide can be prereacted with the tannin prior to the addition of the other reactants to the reaction medium.

Carbonyl compounds which can be used in the practice of the invention include any aldehyde or ketone containing a $>C=O$ group, the carbon atom of which is capable of becoming a methylene or substituted methylene group. Thus, aldehydes and ketones which can be used can be represented by the formula $(R)_2C=O$ wherein R is as defined above. Since said R is non-functional in the reaction, there is no real limit on what it is or the number of carbon atoms which it contains. However, when R is unduly large, solubility problems in the aqueous reaction medium and also in connection with the solubility of the reaction product are encountered. The larger R groups tend to make the product hydrophobic. In general, this is undesirable when the products are used as the additives in the drilling fluids of the invention. Thus, since it is preferred to carry out the reaction in an aqueous medium, it is preferred as a practical matter that when R is not hydrogen, it is an alkyl group containing from 1 to 5 carbon atoms, more preferably 1 to 3 carbon atoms.

Examples of said preferred aldehydes and ketone include:

| | |
|---|---|
| formaldehyde | acetone |
| acetaldehyde | methyl ethyl ketone |
| propionaldehyde | diethyl ketone |
| n-butyraldehyde | methyl n-propyl ketone |
| isobutyraldehyde | methyl isopropyl ketone |
| n-valeraldehyde | |

The sulfur compound used in the practice of the invention is, in general, sulfurous acid and its water-soluble salts such as the alkali metal salts and including the ammonium salts. The alkali metal (as defined above) sulfites are preferred. It is pointed out that when a bisulfite or sulfurous acid is added to the alkaline reaction medium, it will be converted to a sulfite. Therefore, herein and in the claims, unless otherwise designated, the term "sulfite" is employed generically to include sulfurous acid and bisulfites which, when added to the alkaline reaction medium, will be converted to and react as sulfites.

The amounts of the above-described reactants which are used are not critical. So long as a significant amount of each of said reactants is present, the desired rections will proceed to some extent and some yield of metal complex of sulfoalkylated tannin will be obtained. The amounts of each reactant used will depend upon the amount, the kind of tannin, and the percentage of conversion of said tannin which is desired. For results approaching the optimum, it is preferred to use amounts of said reactants which are within the range of from 0.5 to 1.5 times the stoichiometric equivalent amount of each reactant which is required to completely react the tannin. Amounts of said reactants which are less than stoichiometric result in less than 100 percent conversion. Amounts in excess of stoichiometric result in a waste of material. Thus, it is preferred to use substantially stoichiometric equivalent amounts of said reactants. For example, the amount of sulfite and aldehyde or ketone is preferably the stoichiometric equivalent amount required in the sulfoalkylation reaction. When the aldehyde or ketone and the sulfite are prereacted, they are preferably prereacted in stoichiometric equivalent amounts. The amount of the iron or other metal compound used is preferably an amount which is stoichiometrically equivalent to that required to completely complex the tannin.

From the above it is seen that specific numerical ranges for the amounts of said reactants will be of only limited value in teaching this invention and it is to be understood the invention is not limited to any such specific numerical ranges. Those skilled in the art can readily determine from a few pilot experiments the stoichiometric amounts of reactants required for the particular tannin being reacted. However, as an aid to those less skilled in the art, the following ranges, based upon the specific examples given hereinafter were set forth in said copending application.

TABLE I.—AMOUNT OF REAGENTS PER 100 LBS. OF TANNIN

| Reagent | Broad Range, lbs. | Preferred Range, lbs. |
| --- | --- | --- |
| Alkali metal hydroxide | 5–60 | 15–30 |
| Sulfite | 4–115 | 20–70 |
| Aldehyde or Ketone | 1–35 | 5–30 |
| Complexing Metal:* | | |
| Fe | 5–32 | 10–26 |
| Cu, Zn | 9–55 | 18–46 |
| Cr, Ni, Co, Mn, Ti, and V | 4–33 | 9–28 |
| All above metals | 4–55 | 9–46 |

*Calculated as the metal.

However, the ranges set forth in the following Table I–A are presently more preferred.

TABLE I-A.—AMOUNTS OF REAGENTS PER 100 LBS. OF TANNIN

| Reagent | Broad Range, lbs. | Preferred Range, lbs. | Preferred Range for Quebracho, lbs. |
| --- | --- | --- | --- |
| Alkali metal hydroxide | 5–60 | 10–20 | 12–18 |
| Sulfite | 4–115 | 20–70 | 35–65 |
| Aldehyde or ketone | 1–60 | 5–50 | 15–36 |
| Complexing metal:* | | | |
| Fe | 1–56 | 10–26 | 6–20 |
| Cu | 1.5–64 | 18–46 | 6.5–21 |
| Zn | 1.5–65 | 18–46 | 6.7–22 |
| Cr | 0.8–52 | 9–28 | 5.8–17 |
| Ni | 1–59 | 9–28 | 6.5–20 |
| Co | 1–58 | 9–28 | 6.5–19 |
| Mn | 1–55 | 9–28 | 6–18 |
| Ti | 0.8–48 | 7–30 | 5.3–16 |
| V | 0.9–51 | 7–30 | 5.8–17 |
| Al | 0.3–27 | 4–12 | 3–9 |
| All above metals | 0.3–64 | 4–46 | 3–22 |

*Calculated as the metal.

The above preferred amounts of reactants can be stated in other ways. For example, in working with the amounts shown in the above Table I–A, the preferred amount of metal complexing agent (calculated as the metal) to be added to the sulfoalkylated tannin is in the range of from $\frac{1}{20}$ to 3, preferably $\frac{1}{20}$ to 1, more preferably $\frac{1}{8}$ to $\frac{5}{8}$, mols of metal per monomer mol of active ingredient in the particular tannin compound being used. In other words, it is preferred that no excess metal be present in the reaction mixture at the conclusion of the metal complexing reaction. For example, when quebracho extract is the tannin being used, quebracho catechin is considered to be the active ingredient of the quebracho. Based on a molecular weight of 274 for said quebracho catechin, 100 pounds of quebracho extract will contain an average of 0.33 pound mols of quebracho catechin, and the preferred range of reagents given in column 3 of the above Table I–A has been established on this basis. When other tannin materials are used, the molecular weight of the active ingredient thereof, as well as the amount contained per 100 pounds of tannin, may be different. Thus, it is desirable that the quantities of reagents to be used be established for each particular tannin material used. Those skilled in the art will have no difficulty establishing the amounts of reagents to use in view of this disclosure. Any large deviation from the 0.33 mol of active ingredient in any individual lot of quebracho extract would also require an adjustment of the chemicals used for reacting with said quebracho. However, analyses of six commercially available quebracho extracts available from different sources has shown that commercial quebracho extract is surprisingly uniform in composition.

The amount of carbonyl compound, e.g., formaldehyde, and the amount of sulfite compound, e.g., sodium bisulfite, used in the reaction will determine the amount of sulfoalkylation of the tannin compound which occurs. This affords another way of expressing the amount of carbonyl compound and sulfite. The amount of sulfoalkylation which occurs in any given reaction situation can be expressed in terms of the parts by weight of the carbonyl compound-sulfite addition product or sulfoalkylation reagent, e.g., $NaSO_3CH_2OH$—formed by reacting stoichiometric amounts of formaldehyde and sodium bisulfite, used per 200 parts by weight of tannin. For example, expressed in this manner and when using formaldehyde, sodium bisulfite, and quebracho, the most preferred amounts of sodium formaldehyde bisulfite addition product will be within the range of from 50 to 175 parts by weight of the sulfomethylation reagent per 200 parts by weight of quebracho.

In general, the reaction conditions are not critical. All the reactions involved in the practice of the invention will take place at ordinary room temperatures (70–80° F.) but at a reduced rate and all reaction conditions at which the reactions will take place are within the scope of the invention. However, as a practical matter, is is preferred to employ elevated temperatures to cause said reactions to take place in less time. Any suitable temperature below the decomposition temperature of the tannin can be employed. For example, the application of heat aids in dissolving quebracho in the alkaline medium. As a general rule, temperatures in the order of 125 to 212° F. are sufficient. However, usually a more preferred range is from 180 to 212° F. If desired, the reaction mixture can be refluxed at atmospheric pressure, or can be heated in an autoclave under superatmospheric pressure to obtain higher temperatures. In general, the maximum temperatures employed will be in the order of 300° F. Thus, an over-all numerical range for the reaction temperatures can be said to be from 70 to 300° F.

The reaction time will be dependent upon the reaction temperature employed. Reaction times in the order of 0.5 to 10 hours have been found quite sufficient. Preferably, the reaction times will be within the range of 1 to 6, more preferably 1 to 4, hours.

The amount of the metal complex additives of the invention used in drilling fluids in accordance with the invention will vary from well to well depending upon conditions encountered in the drilling of the well, the characteristics of the particular drilling fluid being used, the formations being drilled, etc. For example, as the drilling of the well progresses and the well becomes deeper and temperatures in the well increase, or the drilling fluid becomes contaminated, more additive will usually be required because of said increased temperatures and/or contamination. While therefore the amount of additive used is not of the essence of the invention, it can be stated that the amount of said additive used will normally be within the range of 0.1 to 30, preferably 0.1 to 15, and more preferably 1 to 15, pounds per barrel of drilling fluid. However, it is within the scope of the invention to employ amounts of the additive which are outside said ranges. For example, the amount of additive used will always be an amount which is sufficient to reduce the water loss due to filtration and/or effect an improvement or reduction in the rheological properties of the drilling fluid such as a decrease in yield point, 10-minute gel, or shear strength. As used herein and in the claims, unless otherwise specified, the word "barrel" refers to a barrel of 42 standard U.S. gallons.

The following examples will serve to further illustrate the invention. In the following examples the additives of the invention were tested in seven different base muds. These base muds were all prepared in conventional manner. In general, the method of preparation of said base muds comprised preparing said muds in five-gallon batches in a suitable blending mill such as a Lear Blend-A Mill. The prepared muds were stirred for at least 30 minutes or more then aged for three days or more prior to use. The compositions of said base muds are set forth in the following examples and/or in the tables setting forth the results of said examples. In these examples sulfomethylated quebracho is sometimes referred to as "SMQ," for convenience. Similarly, the metal complex additives of the invention are sometimes referred to as SMQ-metal complexes. For example, the iron complex of sulfomethylated quebracho is referred to as "SMQ-Fe," the copper complex as "SMQ-Cu," etc.

Example I

An iron complex of sulfomethylated quebracho was prepared as follows: 200 grams of ground commercial quebracho extract (11.9 wt. percent water), 500 ml. of water, and 100 ml. of sodium hydroxide (0.5 g. NaOH per ml.) were placed in a beaker and heated to a temperature of about 190° F. to dissolve said quebracho. A second solution was prepared by mixing 104 grams of sodium bisulfite, 89.3 ml. of 36 percent formaldehyde solution, and 500 ml. of water in a separate beaker. The latter solution was mixed and allowed to react for approximately 30 minutes using no external heat source. Said two solutions were then mixed and maintained at a temperature of approximately 160° F. for about 1.5 hours. The resulting solution was then drum dried to recover a sulfomethylated quebracho product.

Freshly precipitated iron hydroxide was prepared by dissolving 7.6 grams of $FeCl_3 \cdot 6H_2O$ in water and precipitating said hydroxide by the addition of ammonia. The precipitate was filtered and washed. A solution of said sulfomethylated quebracho product was prepared by dissolving 20 grams of same in water. Said precipitated ferric hydroxide was then added to the sulfomethylated quebracho solution, and the resulting solution was heated and maintained at a temperature of about 160° F. for 1.5 hours. The solution was then dried on a hot plate under a heat lamp. The dry product, an iron complex of sulfomethylated quebracho, was then ground.

Example II

Another iron complex of sulfomethylated quebracho was prepared as follows: 233 grams of ground commercial quebracho extract (11.9 wt. percent water), 500 ml. of water, and 100 ml. of sodium hydroxide solution (0.5 g. NaOH per ml.) were mixed in a first beaker and heated for one hour with stirring at a temperature of 190° F. in order to dissolve the quebracho and form a first solution. A second solution was formed by adding 208 grams of sodium bisulfite and 178.6 ml. of 36 percent formaldehyde solution to 750 ml. of water. The mixture was allowed to react for 45 minutes, using no external heat source. Said second solution was then added to said first solution and the combined solution was heated on a hot plate for about 4 hours during which time the temperature was increased from 122° F. to 211° F.

Freshly precipitated ferric hydroxide was prepared by dissolving 135.15 grams of $FeCl_3 \cdot 6H_2O$ in 2.5 liters of water and precipitating said hydroxide by adding 150 ml. of concentrated ammonia solution. The resulting precipitate was filtered and washed, and then added to said combined first and second solutions. The resulting mixture was heated with stirring for 2.5 hours at a temperature of 180–190° F. and the iron hydroxide precipitate was taken into solution. The resulting solution was then evaporated on a drum drier to recover the dry product, an iron complex of sulfomethylated quebracho.

Example III

A base mud having a composition of 50 pounds of McCracken clay per barrel of water was prepared in conventional manner. Samples of said base mud containing 4 and 8 pounds per barrel respectively of the iron complex of sulfomethylated quebracho product of Example I per barrel of said mud were prepared for tests. A second set of samples of said base mud containing 4 and 8 pounds per barrel respectively of the iron complex of sulfomethylated quebracho product of Example II were also prepared for tests. API Code RP–13B properties were then determined on each of said samples with a Model 35 Fann V-G multi-speed viscosimeter and filter presses. The procedure for determination of API Code RP–13B properties employing the Fann V-G viscosimeter is described by Chisholm and Kohen, Petroleum Engineer, 26 (4), B–87 to B–90 (April 1954). The results of said tests are set forth in Table II below.

TABLE II.—ADDITIVES IN BASE MUD NO. 1 (50 LBS./BBL. McCRACKEN CLAY IN WATER)

|  | Base Mud | Run No. 1 | Run No. 2 | Run No. 3 | Run No. 4 |
|---|---|---|---|---|---|
| Additive: |  |  |  |  |  |
| A,* lbs./bbl. mud | 0 | 4 | 8 | 0 | 0 |
| B,* lbs./bbl. mud | 0 | 0 | 0 | 4 | 8 |
| Mud Properties: |  |  |  |  |  |
| pH | 7.8 | 7.7 | 7.9 | 8.0 | 8.2 |
| Water loss, ml. in 30 min | 35 | 6.9 | 4.0 | 6.6 | 5.0 |

A*=Iron complex of sulfomethylated quebracho prepared in Example I.
B*=Iron complex of sulfomethylated quebracho prepared in Example II.

Example IV

Another iron complex of sulfomethylated quebracho was prepared as follows: 200 grams of ground commercial quebracho extract (11.9 weight percent water), 500 ml. of water, and 100 ml. of sodium hydroxide (0.5 g. NaOH per ml.) were placed in a beaker and heated for 1.5 hours at a temperature of about 200° F. to dissolve said quebracho. Another solution was prepared by mixing 104 grams of sodium bisulfite, 89.3 ml. of 36 percent formaldehyde solution, and 500 ml. of water in a separate beaker, and allowing the mixture to react for 30 minutes at room temperature. Said two solutions were then mixed and heated for 3 hours at 205° F.

Freshly precipitated iron hydroxide was prepared by dissolving 50 grams of $FeCl_3 \cdot 6H_2O$ in water and precipitating said hydroxide by the addition of concentrated ammonia solution. The resulting precipitate was filtered and washed, and then added to the above-combined first and second solutions. The resulting mixture was heated, with stirring, for two hours at a temperature of 200–205° F. and the iron hydroxide precipitate was taken into solution. The resulting solution was then evaporated on a drum drier to recover the dry product, an iron complex of sulfomethylated quebracho.

*Example V*

A base mud having a composition of 20 weight percent kaolin and 4 weight percent bentonite in water was prepared in conventional manner. Samples of said base mud containing 3 and 6 pounds per barrel respectively of the sulfomethylated quebracho product of Example I were prepared for tests. Samples of said base mud containing 3 and 6 pounds per barrel respectively of the iron complex of sulfomethylated quebracho product of Example IV were also prepared for tests. Samples of said base mud containing 3 and 6 pounds per barrel respectively of the iron complex of sulfomethylated quebracho product of Example I were also prepared for tests.

All of said samples were then tested for API Code 29 properties in accordance with the procedure employed in Example III. The results of said tests are given in Table III below.

*Example VII*

A series of additives in accordance with the invention was prepared. The amounts of reagents used and reaction conditions employed in preparing said additives are set forth in Table V below. All of said additives were prepared in the same general manner. Generally speaking, the method of preparation was as follows. The indicated amount of water was added to a suitably-sized reaction vessel. The indicated weight of sulfomethylated agent was then added to said water and was dissolved without the addition of external heat. In preparing samples A and B the sodium bisulfite and formaldehyde were added separately in the amounts indicated. In the remaining samples, stoichiometric amounts of formaldehyde and sodium bisulfite were prereacted as described elsewhere herein and then added to the water. The indicated volume of sodium hydroxide solution (0.5 gram per milliliter) was then added to the solution with stirring. Heating was initiated and the ground quebracho in the amount indicated was added gradually with stirring, and the addition of heat. The average temperature maintained and the reaction time are shown under the heading "sulfomethylation reaction." The metal complexing agent(s), if used, was then added to the hot solution either dry or in solution as indicated in said Table V.

TABLE III.—ADDITIVES IN BASE MUD NO. 2 (20 WT. PERCENT KAOLIN AND 4% BENTONITE IN WATER)

|  | Base Mud | Run No. | | | | | | | |
|---|---|---|---|---|---|---|---|---|---|
|  |  | 1 | 2 | 3 | 4 | 5 | 6 | 7 | 8 |
| Additive: |  |  |  |  |  |  |  |  |  |
| B,* lbs./bbl. mud | 0 | 3 | 6 | 0 | 0 | 0 | 0 | 0 | 0 |
| D,* lbs./bbl. mud | 0 | 0 | 0 | 3 | 6 | 0 | 0 | 0 | 0 |
| C,* lbs./bbl. mud | 0 | 0 | 0 | 0 | 0 | 3 | 6 | 0 | 0 |
| Quebracho | 0 | 0 | 0 | 0 | 0 | 0 | 0 | 3 | 6 |
| Initial Properties: |  |  |  |  |  |  |  |  |  |
| Plastic viscosity, cps | 18 | 14 | 12 | 17 | 19 | 16 | 14 | 19 | 20 |
| Yield point, lbs./100 ft.$^2$ | 14 | 3 | 5 | 6 | 7 | 8 | 9 | 8 | 7 |
| Initial gel strength, lbs./100 ft.$^2$ | 3 | 2 | 2 | 1 | 3 | 4 | 5 | 3 | 3 |
| 10-min. gel strength, lbs./100 ft.$^2$ | 23 | 3 | 3 | 6 | 7 | 16 | 16 | 12 | 7 |
| pH | 9.1 | 9.1 | 9.1 | 7.4 | 8.4 | 7.9 | 8.0 | 8.9 | 9.0 |
| Water loss, ml. in 30 min | 10.0 | 7.0 | 5.0 | 6.0 | 4.4 | 9.2 | 10.2 | 8.4 | 7.6 |

B* = Iron complex of sulfomethylated quebracho prepared in Example I.
D* = Iron complex of sulfomethylated quebracho prepared in Example IV.
C* = Sulfomethylated quebracho prepared in Example I.

*Example VI*

Base mud No. 3 was prepared from base mud No. 2 of Example V by adding 5 pounds per barrel of gypsum thereto, as a contaminant. Samples of said base mud No. 3 containing 3 and 6 pounds per barrel respectively of the sulfomethylated quebracho product of Example I were prepared for tests. Samples of said base mud containing 3 and 6 pounds per barrel, respectively, of the iron complex of sulfomethylated quebracho product of Example IV were also prepared for tests. Samples of said base mud No. 3 containing 3 and 6 pounds per barrel respectively of the iron complex of sulfomethylated quebracho product of Example I were also prepared for tests.

Each of said samples was then tested for pH and water loss values (API Code 29 procedure). The results of said tests are set forth in Table IV below.

Another larger scale batch of SMQ-Fe was also prepared. This batch is identified in Table V below as Sample No. M. In this preparation, 275 gallons of water was added to a 2100-gallon reactor tank equipped with a double-bladed stirring means. A 37 weight percent formaldehyde solution in the amount of 110 pounds was then added to said water. The resulting solution was stirred and 1300 pounds of sodium bisulfite was added thereto over a period of approximately 45 minutes. During this period the temperature of the solution increased from about 65° F. to about 120° F. After the reaction between the sodium bisulfite and formaldehyde had been completed, as evidenced by a constant temperature, approximately 35 gallons of a 50 weight percent sodium hydroxide solution was added. The temperature of the solution increased further to about 150° F. At this time 2250 pounds of quebracho were added slowly over a TABLE IV.—ADDITVES IN BASE MUD NO. 3 (20 WT. PERCENT KAOLIN AND 4 WT. PERCENT BENTONITE IN WATER PLUS 5 LBS. PER BBL. OF GYPUSM CONTAMINANT)

|  | Base Mud | Run No. | | | | | | | |
|---|---|---|---|---|---|---|---|---|---|
|  |  | 1 | 2 | 3 | 4 | 5 | 6 | 7 | 8 |
| Additive: |  |  |  |  |  |  |  |  |  |
| B,* lbs./bbl. mud | 0 | 3 | 6 | 0 | 0 | 0 | 0 | 0 | 0 |
| D,* lbs./bbl. mud | 0 | 0 | 0 | 3 | 6 | 0 | 0 | 0 | 0 |
| C,* lbs./bbl. mud | 0 | 0 | 0 | 0 | 0 | 3 | 6 | 0 | 0 |
| Quebracho | 0 | 0 | 0 | 0 | 0 | 0 | 0 | 3 | 6 |
| Initial Properties: |  |  |  |  |  |  |  |  |  |
| pH | 7.6 | 8.6 | 8.4 | 8.4 | 8.6 | 8.2 | 8.3 | 7.9 | 8.0 |
| Water loss, ml. in 30 min | 47 | 26 | 9.3 | 17 | 16 | 40 | 32 | 47 | 40 |

*Additives B, D, and C same in Table II.

period of approximately 20 to 25 minutes. During this time the temperature increased to about 200° F. and the temperature was maintained within the range of 190 to 200° F. for approximately 2½ hours. The tank contents were vigorously agitated during the addition of the quebracho. At this time 1600 pounds of Ferrifloc (a commercial ferric sulfate) were added slowly over a period of approximately 2 hours with the temperature remaining within the range of about 190 to about 200° F. After addition of the Ferrifloc was complete the tank contents were circulated for approximately one hour and then passed to a drum drier for recovery of the reaction product, i.e., an iron complex of sulfomethylated quebracho (SMQ-Fe).

The above-described samples of metal complexes of sulfomethylated quebracho were then used in preparing samples of drilling mud by adding various quantities of said additives to one or more of base mud Nos. 4 to 7. These drilling mud samples containing the additives of the invention were all prepared in conventional manner. API Code 29 properties were then determined on said drilling mud samples in the same manner as described in Example III above. Shear strength tests were also run employing a Baroid high temperature aging cell or bomb. Briefly, this test comprises placing a sample of the mud to be evaluated in the test cell or bomb, closing the bomb, and placing same in a hot oil bath or hot air oven maintained at a uniform temperature. After the desired period of aging at the desired temperature, the bomb is cooled to a temperature below 150° F. and opened. A shear tube, made from stainless steel, is placed on the surface of the sample and sufficient gram weights, if necessary, are placed on the tube to start its downward motion. Unless too much weight has been placed on the tube, it will stop its downward motion at the point where the shear strength of the gelled sample against the surface of the tube is sufficient to support the applied weight. The length of the tube exposed above the sample is then measured. The shear strength in pounds per 100 square feet is obtained from a nomograph by utilizing the force, in grams, applied to the shear tube and the length of exposed tube after the tube reaches equilibrium. Further details of said test can be obtained from "Apparatus and Procedure for the Field Testing of Drilling Muds," pp. 900–25 and 900–26, Baroid Division, National Lead Co., P.O. Box 1675, Houston, Tex. See also "Measuring and Interpreting High Temperature Shear Strength of Drilling Fluids," Watkins and Nelson, vol. 198, pp. 213–218, Petroleum Transactions, AIME (1953).

The composition of said base muds, said drilling mud samples, and the results of tests thereon are set forth in Tables VI to XI below. In Tables VII to XI, tests on comparative drilling mud samples containing commercially available additives of the prior art are also set forth for comparative purposes.

TABLE V.—PREPARATION SUMMARY: SULFOMETHYLATED QUEBRACHO AND METAL COMPLEXES THEREOF

| Sample No. | Vol. H₂O, ml. | Weight NaSO₃CH₂OH grams | Weight NaHSO₃, grams | Vol. 37% HCHO ml. | Vol. NaOH, ml. | Weight Quebracho, grams | Sulfomethylation Reaction | | Metal Salt | | Vol. of Metal Salt Solution, ml. | Moles Metal per Monomer Mol Quebracho |
|---|---|---|---|---|---|---|---|---|---|---|---|---|
| | | | | | | | Time, Hr.: Min. | Avg. Temp., °F. | Species | Weight, Grams | | |
| A | 320 | | 116 | 83 | 40 | 200 | 4:00 | 189 | Al(NO₃)₃·9H₂O | 161 | 250 | 5/6 |
| B | 960 | | 348 | 249 | 120 | 600 | 4:32 | 181 | Ferrifloc | 420 | | 5/6 |
| B-1 | 400 | 150 | | | 40 | 200 | 3:18 | 187 | Al₂(SO₄)₃·18H₂O | 178 | 500 | 5/6 |
| C | 400 | 150 | | | 40 | 200 | 3:55 | 189 | V₂O₅ | 49 | | 5/6 |
| D | 400 | 150 | | | 40 | 200 | 2:05 | 185 | MnSO₄·H₂O | 91 | 225 | 5/6 |
| E | 400 | 150 | | | 40 | 200 | 3:08 | 185 | CoSO₄·7H₂O | 151 | 250 | 5/6 |
| F | 400 | 150 | | | 40 | 200 | 2:11 | 185 | NiSO₄·6H₂O | 141 | 250 | 5/6 |
| G | 400 | 150 | | | 40 | 200 | 2:54 | 185 | Cr₂(SO₄)₃·5H₂O | 129 | 400 | 5/6 |
| H | 400 | 150 | | | 40 | 200 | 2:54 | 192 | CuSO₄·5H₂O | 134 | 500 | 5/6 |
| I | 400 | 150 | | | 40 | 200 | 2:54 | 185 | ZnSO₄·7H₂O | 154 | 500 | 5/6 |
| J | 400 | 150 | | | 40 | 200 | 4:02 | 185 | TiCl₄ | ¹59 | | 5/6 |
| K | 1,200 | 450 | | | ²60 | 600 | 4:10 | 189 | CuSO₄·5H₂O | 402 | 800 | 5/6 |
| L | 1,200 | 450 | | | 120 | 600 | 4:10 | 198 | | | | |
| M | (³) | (³) | (³) | (³) | (³) | (³) | (³) | (³) | (³) | (³) | (³) | (³) |
| N | 2,000 | 150 | | | ⁴140 | 200 | 4:08 | 205 | {Cr(NO₃)₃·9H₂O, Fe(NO₃)₃·9H₂O} | 127.9, 45.2 | 1,000 | |
| O | 200 | 150 | | | ⁴140 | 200 | 2:42 | 200 | {Cr(NO₃)₃·9H₂O, Fe(NO₃)₃·9H₂O} | 87.1, 86.6 | 1,000 | |

¹ Milliliters.
² 60 grams of solid NaOH added.
³ See paragraph 2 of Example VI for details.
⁴ Added in two portions, 40 ml. after the NaSO₃CH₂OH was added and 100 ml. after the metal salt solutions.

TABLE VI.—ADDITIVES IN BASE MUD NO. 4 (20 WT. PERCENT KAOLIN AND 4 WT. PERCENT BENTONITE IN WATER PLUS SUFFICIENT BARITES* TO GIVE MUD WEIGHT OF 12.2 LBS./GAL.

| | Base Mud | Run Number | | | | | | | | | |
|---|---|---|---|---|---|---|---|---|---|---|---|
| | | 1 | 2 | 3 | 4 | 5 | 6 | 7 | 8 | 9 | 10 |
| | | SMQ-Cu | | SMQ-Zn | | SMQ-Mn | | SMQ-Co | | SMQ-Ni | |
| Additive: | | | | | | | | | | | |
| Sample No. (Table V) | | H | H | I | I | D | D | E | E | F | F |
| Lbs./bbl. mud | 0 | 2.5 | 5.0 | 2.5 | 5.0 | 2.5 | 5.0 | 2.5 | 5.0 | 2.5 | 5.0 |
| Initial Properties: | | | | | | | | | | | |
| Plastic viscosity, cps | 25 | 24 | 27 | 22 | 25 | 25 | 27 | 25 | 25 | 24 | 25 |
| Yield point, lbs./100 ft.² | 33 | 4 | 4 | 2 | 1 | 3 | 6 | 4 | 4 | 4 | 5 |
| Initial gel, lbs./100 ft.² | 29 | 2 | 3 | 1 | 1 | 2 | 3 | 1 | 2 | 3 | 3 |
| 10-min. gel, lbs./100 ft.² | 85 | 3 | 4 | 2 | 2 | 2 | 4 | 7 | 8 | 13 | 11 |
| pH | 8.4 | 9.1 | 9.0 | 9.3 | 9.3 | 9.1 | 9.0 | 9.5 | 9.2 | 9.1 | 9.1 |
| After Aging 3 days at 350° F.: | | | | | | | | | | | |
| Plastic viscosity, cps | 28 | 34 | 25 | 26 | 25 | 23 | 24 | 29 | 29 | 25 | 24 |
| Yield point, lbs./100 ft.² | 35 | 4 | 6 | 9 | 6 | 6 | 5 | 13 | 8 | 24 | 4 |
| Initial gel, lbs./100 ft.² | 16 | 2 | 2 | 3 | 3 | 3 | 2 | 3 | 3 | 3 | 2 |
| 10-min. gel, lbs./100 ft.² | 63 | 3 | 7 | 27 | 12 | 13 | 13 | 32 | 19 | 14 | 2 |
| Water loss, ml./30 min. | 10.2 | 10.0 | 10.0 | 9.8 | 10.2 | 11.6 | 11.0 | 9.8 | 9.8 | 10.6 | 10.2 |
| pH | 8.2 | 8.6 | 8.5 | 8.5 | 8.4 | 8.3 | 8.2 | 8.6 | 8.6 | 8.5 | 8.6 |
| Shear Strength, lbs./100 ft.² | 800 | 170 | 160 | 165 | 145 | 120 | 135 | 340 | 165 | 280 | 90 |

TABLE VI.—Continued

| | Run Number | | | | | | | | | | |
|---|---|---|---|---|---|---|---|---|---|---|---|
| | 11 | 12 | 13 | 14 | 15 | 16 | 17 | 18 | 19 | 20 | Base Mud [a] |
| | SMQ-Cr | | SMQ-V | | SMQ-Al | SMQ-Fe | | SMQ-Ti | SMQ-Fe-Cr | SMQ-Fe-Cr | |
| Additive: | | | | | | | | | | | |
| Sample No. (Table V) | G | G | C | C | A | B | B | J | | 0 | |
| Lbs./bbl. mud | 2.5 | 5.0 | 2.5 | 5.0 | 10.0 | 2.5 | 5.0 | 2.5 | 10 | 10 | |
| Initial Properties: | | | | | | | | | | | |
| Plastic viscosity, cps | 23 | 33 | 25 | 24 | 36 | 27 | 33 | 36 | 43 | 55 | 35 |
| Yield point, lbs./100 ft.$^2$ | 6 | 4 | 3 | 5 | 10 | 4 | 13 | 10 | 17 | 19 | 21 |
| Initial gel, lbs./100 ft.$^2$ | 1 | 2 | 3 | 3 | 5 | 1 | 3 | 3 | 10 | 3 | 34 |
| 10-min. gel, lbs./100 ft.$^2$ | 8 | 6 | 3 | 5 | 10 | 2 | 9 | 9 | 50 | 7 | 76 |
| pH | 9.2 | 9.2 | 9.4 | 9.6 | 8.8 | 9.1 | 9.4 | [b] 9.8 | 9.2 | 9.2 | 8.1 |
| After Aging 3 days at 350° F.: | | | | | | | | | | | |
| Plastic viscosity, cps | 26 | 26 | 29 | 30 | 34 | 23 | 24 | 34 | 63 | 61 | 33 |
| Yield point, lbs./100 ft.$^2$ | 6 | 2 | 6 | 7 | 4 | 7 | 4 | 19 | 17 | 21 | 72 |
| Initial gel, lbs./100 ft.$^2$ | 2 | 1 | 3 | 3 | 3 | 2 | 2 | 14 | 4 | 5 | 79 |
| 10-min. gel, lbs./100 ft.$^2$ | 7 | 3 | 3 | 4 | 4 | 18 | 5 | 60 | 10 | 14 | 137 |
| Water loss, ml./30 min | 9.8 | 9.2 | 9.6 | 8.8 | [b] 8.0 | 10.8 | 9.8 | 9.8 | [c] 7.0 | [d] 4.5 | [e] 1.1 |
| pH | 8.5 | 8.4 | 8.5 | 8.5 | 8.5 | 8.4 | 8.4 | 8.5 | 8.3 | 8.5 | 8.1 |
| Shear Strength, lbs./100 ft.$^2$ | 150 | 21 | 340 | 320 | 60 | 165 | 150 | 590 | 300 | 250 | 470 |

*Commercial product.
[a] For Runs 19 and 20.
[b] Initial water loss was 2.6.
[c] Initial water loss was 7.3.
[d] Initial water loss was 6.2.
[e] Initial water loss was 9.5.
[f] Aged at 405° F.

TABLE VII.—ADDITIVES IN BASE MUD NO. 5 (6 WT. PERCENT BENTONITE IN WATER)

| | Base Mud | Run Number | | | | | | | | | |
|---|---|---|---|---|---|---|---|---|---|---|---|
| | | 1 | 2 | 3 | 4 | 5 | 6 | 7 | 8 | 9 | 10 |
| | | SMQ | SMQ-Fe | | SMQ-Cu | | SMQ-Al | | Q-Broxin | Quebracho | |
| Additive: | | | | | | | | | | | |
| Sample No. (Table V) | | L | M | M | K | K | B-1 | B-1 | | | |
| Lbs./bbl. mud | 0 | 5 | 5 | 10 | 5 | 10 | 5 | 10 | 5 | 2.5 | 5 |
| Initial Properties: | | | | | | | | | | | |
| Plastic viscosity, cps | 21 | 18 | 15 | 18 | 16 | 17 | 14 | 18 | 16 | 21 | 19 |
| Yield point, lbs./100 ft.$^2$ | 51 | 31 | 4 | 20 | 3 | 6 | 5 | 12 | 4 | 34 | 35 |
| Initial gel, lbs./100 ft.$^2$ | 36 | 21 | 3 | 2 | 2 | 4 | 1 | 2 | 2 | 17 | 19 |
| 10-min. gel, lbs./100 ft.$^2$ | 82 | 26 | 4 | 9 | 3 | 8 | 2 | 3 | 3 | 30 | 16 |
| pH | 9.5 | 9.4 | 10.0 | 9.3 | 9.3 | 9.6 | 9.5 | 9.3 | 10.0 | 9.3 | 9.2 |
| After Aging 3 days at 350° F.: | | | | | | | | | | | |
| Plastic viscosity, cps | 26 | 14 | 11 | 11 | 13 | 12 | 10 | 9 | 16 | 16 | 18 |
| Yield point, lbs./100 ft.$^2$ | 47 | 5 | 2 | 1 | 3 | 3 | 2 | 1 | 5 | 4 | 5 |
| Initial gel, lbs./100 ft.$^2$ | 12 | 2 | 1 | 1 | 3 | 2 | 1 | 3 | 2 | 2 | 1 |
| 10-min. gel, lbs./100 ft.$^2$ | 35 | 3 | 1 | 1 | 3 | 3 | 1 | 3 | 2 | 2 | 1 |
| Water loss, ml./30 min | 11.2 | 10.2 | 10.4 | 7.4 | 8.8 | 7.8 | 10.4 | 10.2 | 12.0 | 9.8 | 9.4 |
| pH | 8.4 | 8.5 | 8.8 | 8.3 | 8.4 | 8.1 | 8.3 | 8.3 | 8.5 | 8.5 | 8.4 |
| Shear Strength, lbs./100 ft.$^2$ | 380 | 360 | 120 | 67 | 105 | 70 | 21 | 18 | 150 | 210 | 650 |

TABLE VIII.—ADDITIVES IN BASE MUD NO. 6 (20 WT. PERCENT P95 ROTARY CLAY (AN ILLITIC CLAY) AND 4 WT. PERCENT BENTONITE IN WATER, PLUS SUFFICIENT BARITE* TO GIVE MUD WEIGHT OF 12.2 LBS./GAL.)

| | Base Mud | Run Number | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| | | SMQ-Fe | | SMQ-Cu | | | SMQ-Zn | | SMQ-Cr | | | SMQ-Al | | Q-Broxin | |
| Additive: | | | | | | | | | | | | | | | |
| Sample No. (Table V) | | M | M | K | K | K | I | I | G | G | G | B-1 | B-1 | | |
| Lbs./bbl. mud | 0 | 5 | 10 | 2.5 | 5 | 10 | 5 | 10 | 2.5 | 5 | 10 | 5 | 10 | 5 | 10 |
| Initial Properties: | | | | | | | | | | | | | | | |
| Plastic viscosity, cps | 34 | 55 | [a] T | 34 | 43 | 47 | 33 | 40 | 32 | 40 | 44 | 47 | 68 | 32 | 35 |
| Yield point, lbs./100 ft.$^2$ | 46 | 73 | T | 14 | 20 | 45 | 6 | 13 | 18 | 22 | 32 | 40 | 111 | 16 | 13 |
| Initial gel, lbs./100 ft.$^2$ | 58 | 36 | T | 3 | 5 | 17 | 3 | 5 | 6 | 6 | 15 | 6 | 30 | 5 | 6 |
| 10-min. gel, lbs./100 ft.$^2$ | 169 | 274 | T | 4 | 12 | 64 | 5 | 9 | 43 | 44 | 69 | 129 | 300+ | 28 | 13 |
| pH | 9.9 | 9.2 | 9.2 | 9.2 | 9.2 | 9.0 | 9.4 | 9.1 | 9.2 | 9.4 | 9.0 | 9.2 | 9.1 | 9.5 | 9.4 |
| After Aging 3 days at 405° F.: | | | | | | | | | | | | | | | |
| Plastic viscosity, cps | 58 | 40 | 33 | 45 | 49 | 51 | 40 | 42 | 46 | 38 | 43 | 27 | 33 | 63 | 51 |
| Yield point, lbs./100 ft.$^2$ | 140 | 180 | 40 | 40 | 41 | 20 | 50 | 31 | 42 | 15 | 10 | 75 | 32 | 93 | 95 |
| Initial gel, lbs./100 ft.$^2$ | 300+ | 198 | 23 | 12 | 8 | 6 | 11 | 6 | 14 | 4 | 3 | 64 | 18 | 145 | 102 |
| 10-min. gel, lbs./100 ft.$^2$ | 284 | 300+ | 170 | 126 | 124 | 23 | 195 | 74 | 135 | 32 | 9 | 221 | 91 | 300+ | 140 |
| Water loss, ml./30 min | 7.0 | 12.2 | 8.8 | 7.4 | 7.4 | 5.0 | 8.0 | 7.0 | 7.8 | 6.6 | 6.0 | 9.0 | 7.8 | 9.6 | 10.2 |
| pH | 7.8 | 7.7 | 8.5 | 8.1 | 8.3 | 8.4 | 9.1 | 8.4 | 8.5 | 8.6 | 7.8 | 8.2 | 8.1 | 8.0 |  |
| Shear Strength, lbs./100 ft.$^2$ | 1,400 | 1,150 | 650 | | 1,100 | 575 | 900 | 900 | 1,050 | 700 | 550 | 1,150 | 700 | 1,400 | 1,800 |

*Commercial product.  [a] T=Too thick to measure.

TABLE IX.—ADDITIVES IN BASE MUD NO. 7 (20 WT. PERCENT P95 ROTARY CLAY (AN ILLITIC CLAY) AND 4 WT. PERCENT BENTONITE IN WATER, CONTAMINATED WITH 2 LBS. /BBL. PORTLAND CEMENT)

| | Base Mud | Run Number | | | | | | | |
|---|---|---|---|---|---|---|---|---|---|
| | | 1 | 2 | 3 | 4 | 5 | 6 | 7 | 8 |
| | | SMQ-Fe | | Q-Broxin | | | Quebracho | | |
| Additive: | | | | | | | | | |
| Sample No. (Table V) | | M | M | | | | | | |
| Lbs./bbl. mud | 0 | 5 | 10 | 2.5 | 5 | 10 | 2.5 | 5 | 10 |
| After Aging 3 Days at 350° F.: | | | | | | | | | |
| Plastic viscosity, cps | 14 | 12 | 11 | 17 | 25 | 31 | 15 | 13 | 35 |
| Yield point, lbs./100 ft.² | 18 | 22 | 17 | 62 | 15 | 13 | 7 | 29 | 18 |
| Initial gel, lbs./100 ft.² | 7 | 22 | 3 | 70 | 3 | 6 | 2 | 33 | 3 |
| 10-min. gel, lbs./100 ft.² | 57 | 95 | 52 | 171 | 20 | 67 | 12 | 171 | 9 |
| Water loss, ml./30 min | 14.2 | 14.4 | 9.8 | 21.0 | 9.4 | 11.2 | 10.6 | 13.4 | 8.8 |
| pH | 8.9 | 8.8 | 8.7 | 9.6 | 8.9 | 9.2 | 9.0 | 9.5 | 8.7 |
| Shear Strength, lbs./100 ft.² | 1,150 | 400 | 340 | 1,100 | 850 | 675 | 600 | 1,000 | 1,600 |

TABLE X.—SUMMARY COMPARISON OF SMQ-Fe AND Q-BROXIN IN BASE MUD NO. 4

| | Run Number | | | | | | | |
|---|---|---|---|---|---|---|---|---|
| | 1 | 2 | 3 | 4 | 5 | 6 | 7 | 8 |
| | SMQ-Fe | Q-Broxin | SMQ-Fe | Q-Broxin | SMQ-Fe | Q-Broxin | SMQ-Fe | Q-Broxin |
| Additive: | | | | | | | | |
| Sample No. (Table V) | B | | B | | B | | B | |
| Lbs./bbl. mud | 2.5 | 2.5 | 5 | 5 | 7.5 | 7.5 | 2.5 | 2.5 |
| After Aging 3 days at | 300° F. | | 300° F. | | 300° F. | | 350° F. | |
| 10-min. gel, lbs./100 ft.² | 4 | 8 | 2 | 4 | 5 | 4 | 24 | 28 |
| Water loss, ml./30 min | 11 | 14 | 10 | 13 | 9.8 | 13 | 11 | 14 |
| Shear Strength, lbs./100 ft.² | 65 | 140 | 43 | 72 | 40 | 72 | 150 | 400 |

| | Run Number | | | | | | | |
|---|---|---|---|---|---|---|---|---|
| | 9 | 10 | 11 | 12 | 13 | 14 | 15 | 16 |
| | SMQ-Fe | Q-Broxin | SMQ-Fe | Q-Broxin | SMQ-Fe | Q-Broxin | SMQ-Fe | Q-Broxin |
| Additive: | | | | | | | | |
| Sample No. (Table V) | B | | B | | B | | B | |
| Lbs./bbl. mud | 5.0 | 5.0 | 7.5 | 7.5 | 5.0 | 5.0 | 10.0 | 10.0 |
| After Aging 3 days at | 350° F. | | 350° F. | | 405° F. | | 405° F. | |
| 10-min. gel, lbs./100 ft.² | 4 | 18 | 6 | 11 | 14 | 40 | 53 | 11 |
| Water loss, ml./30 min | 10 | 14 | 9 | 14 | 7.5 | 12 | 4.8 | 12.5 |
| Shear Strength, lbs./100 ft.² | 120 | 220 | 120 | 240 | 480 | 560 | 550 | 1,250 |

TABLE XI.—COMPARISON OF SMQ-Fe AND CARBONOX IN BASE MUD NO. 4

| | Base Mud | Run Number | | | | | |
|---|---|---|---|---|---|---|---|
| | | 1 | 2 | 3 | 4 | 5 | 6 |
| | | SMQ-Fe | | | Carbonox | | |
| Additive: | | | | | | | |
| Sample No. (Table V) | | B | B | B | | | |
| Lbs./bbl. mud | 0 | 2.5 | 5 | 10 | 2.5 | 5 | 10 |
| Initial Properties: | | | | | | | |
| Plastic viscosity, cps | 28 | 33 | 41 | 41 | 31 | 27 | 31 |
| Yield point, lbs./100 ft.² | 33 | 7 | 20 | 38 | 29 | 23 | 19 |
| Initial gel, lbs./100 ft.² | 28 | 2 | 4 | 7 | 29 | 27 | 21 |
| 10-min. gel, lbs./100 ft.² | 98 | 4 | 20 | 54 | 121 | 110 | 124 |
| pH | 8.4 | 8.8 | 8.7 | 8.1 | 9.2 | 8.5 | 8.6 |
| After Aging 3 days at 176° F.: | | | | | | | |
| Plastic viscosity, cps | 33 | 24 | 29 | 31 | 29 | 27 | 33 |
| Yield point, lbs./100 ft.² | 54 | 3 | 3 | 11 | 15 | 12 | 9 |
| Initial gel, lbs./100 ft.² | 46 | 2 | 2 | 5 | 9 | 9 | 4 |
| 10-min. gel, lbs./100 ft.² | 122 | 4 | 4 | 13 | 32 | 32 | 27 |
| Water loss, ml./30 min | 9.8 | 9.0 | 4.8 | 3.0 | 8.4 | 9.0 | 9.0 |
| pH | 8.1 | 7.9 | 8.0 | 7.8 | 7.6 | 7.3 | 7.1 |
| Shear Strength, lbs./100 ft.² | Not determined on mud samples aged at moderate temperatures | | | | | | |

TABLE XII.—COMPARISON OF SMQ-FE AND CARBONOX IN BASE MUD NO. 4 CONTAMINATED WITH GYPSUM (5 LBS./BBL.)

|  | Base Mud[1] | Run Number | | | | |
|---|---|---|---|---|---|---|
|  |  | 1 | 2 | 3 | 4 | 5 |
|  |  | SMQ-Fe | | | Carbonox | |
| Additive: | | | | | | |
|   Sample No. (Table V) |  | B | B | B |  |  |
|   Lbs./bbl. mud | 0 | 2.5 | 5 | 10 | 5 | 10 |
| Initial Properties: | | | | | | |
|   Plastic viscosity, cps | 28 | 21 | 28 | 46 | 12 | 12 |
|   Yield point, lbs./100 ft.$^2$ | 33 | 23 | 32 | 70 | 91 | 76 |
|   Initial gel, lbs./100 ft.$^2$ | 28 | 4 | 5 | 34 | 70 | 81 |
|   10-min. gel, lbs./100 ft.$^2$ | 98 | 94 | 104 | 141 | 76 | 84 |
|   pH | 8.4 | 8.3 | 8.5 | 8.2 | 8.3 | 8.2 |
| After Aging 3 days at 176° F.: | | | | | | |
|   Plastic viscosity, cps | 33 | 16 | 20 | 30 | 13 | 14 |
|   Yield point, lbs./100 ft.$^2$ | 54 | 11 | 5 | 12 | 66 | 69 |
|   Initial gel, lbs./100 ft.$^2$ | 46 | 5 | 2 | 5 | 52 | 49 |
|   10-min. gel, lbs./100 ft.$^2$ | 122 | 25 | 17 | 18 | 60 | 50 |
|   Water loss, ml./30 min | 9.8 | 14.8 | 4.8 | 2.8 | 36.0 | 32.0 |
|   pH | 8.1 | 7.7 | 7.5 | 7.7 | 7.0 | 7.0 |
| Shear Strength, lbs./100 ft.$^2$ | Not determined on mud samples aged at moderate temperatures | | | | | |

[1] No contaminant in this mud. Contaminant in mud samples in Runs 1-5 inclusive.

TABLE XIII.—SMQ-FE IN BASE MUD NO. 8 (60 LB. PER BBL P95 ROTARY CLAY AND 12 LB. PER BBL. BENTONITE IN WATER, PLUS 4 VOLUME PERCENT NATURAL BRINE*)

|  | Base Mud | SMQ-Fe |
|---|---|---|
| Additive: | | |
|   Sample No. (Table V) |  | B |
|   Lbs./bbl. mud | 0 | 3 |
| Initial Properties: | | |
|   Plastic viscosity, cps | 10 | 12 |
|   Yield point, lbs./100 ft.$^2$ | 52 | 13 |
|   Initial gel, lbs./100 ft.$^2$ | 42 | 2 |
|   10-min. gel, lbs./100 ft.$^2$ | 44 | 72 |
|   pH | 8.8 | 8.0 |
|   Water loss, ml./30 min | 20 | 9.5 |

*Drilling mud fluid contained 700 p.p.m. calcium ion and 8,800 p.p.m. of chloride ion.

Referring to Table VI, the results of tests on ten SMQ-metal complex additives of the invention are set forth. These results indicate one of the outstanding properties of the additives of the invention. The data show that all of said additives are highly effective dispersing or thinning agents for drilling muds. The results obtained when said drilling mud samples were aged for three days at 350° F. are particularly outstanding since this represents a very severe test of the gelation characteristics of the drilling fluid. The remarkably lower yield point, 10-minute gel, and shear strength values obtained on the samples containing the additives of the invention, as compared to the values on the aged base mud, show that the additives of the invention are remarkably effective in protecting the drilling mud from high temperature gelation as encountered in high temperature deep wells.

Referring to Table VII, the results there set forth show that the SMQ-metal complex additives of the invention are superior to either SMQ alone, the commercially available thinning agent Q-Broxin, or quebracho.

Referring to Table VIII, the results of tests on base mud No. 6 containing SMQ-metal complex additives of the invention are set forth. Due to the type of clay used in preparing base mud No. 6, its rheological properties are very difficult to control. The test was made even more severe by aging the drilling mud samples at the higher temperature of 405° F. The results of the tests show that in all instances the additives of the invention were effective in inhibiting or reducing the amount of high temperature gelation. The results of Runs 13 and 14 show that the commercial thinning agent Q-Broxin is not an effective thinner for this mud system.

The results of Run No. 2 in Table VIII are interesting. For some reason not presently understood, 10 pounds of the additive SMQ-Fe caused the drilling mud sample to thicken to the point that the rheological properties could not be measured. However, after said sample was aged the SMQ-Fe additive was very effective in thinning the drilling mud. This shows very strikingly the effectiveness of the additives of the invention as high temperature dispersing or thinning agents. The data show that, if desired, the concentration of the additive could be increased as the well becomes deeper. Said data also show that, if desired, the drilling mud could be aged before using in the well.

Referring now to Table IX, the results there set forth illustrate the effectiveness of the additives of the invention in the presence of cement contamination. The data show that the additive SMQ-Fe, one of the preferred additives of the invention, is very effective, even in the presence of cement contamination. Similar results have been observed with other additives prepared in accordance with the invention. The data in said Table IX also show that the commercial additives Q-Broxin and quebracho are much less effective than the additives of the invention.

Table X sets forth the results of comparative tests between the invention additive SMQ-Fe and the commercial additive Q-Broxin at three levels of concentration and for different aging temperatures. Said data show that the SMQ-Fe additive of the invention is more effective at all levels of concentration and at all aging temperatures than was the commercial additive Q-Broxin.

Tables XI and XII set forth the results of comparative tests between drilling mud samples containing a SMQ-Fe additive of the invention and Carbonox, another commercially available thinning agent, at three levels of concentration. Again, the SMQ-Fe additive of the invention was more effective at all levels.

The data set forth in Table XIII show that the additives of the invention are effective in the presence of salt contamination.

*Example VIII*

This example illustrates the clay swelling inhibitor action of the additives of the invention. Compressed pills of bentonite clay were prepared by compressing bentonite in the mold of a pilling machine at a pressure of 24,000 p.s.i. These pills were cylindrical in shape, having a diameter and a length of about ½ inch. Next, a series of glass tubes, closed at one end and having an inside diameter slightly larger than the diameter of said pills, were fabricated. One pill was inserted into the bottom of each tube and the height or length of the pill in the tube accurately measured. A series of aqueous test solutions containing various amounts of an SMQ-Fe additive of the invention (prepared in substantially the same manner as Sample B in Table V above) were then prepared. The pill in each tube was then covered with an excess of one of said test solutions. Each tube was then placed vertically, open end up, in a bomb containing distilled water in the bottom thereof, to maintain a water vapor phase during the test. The bombs were sealed, and then placed in an oven maintained at the temperature indicated in Table XIV below for a period of 18 hours. The bombs were then cooled to room temperature, opened, and the length or height of the swelled pill measured. A control sample was run at each temperature using distilled water as the swelling medium.

The swelling index (S.I.) is calculated as follows:

$$S.I. = \frac{\text{swelling of pill in solution tested}}{\text{swelling of pill in distilled water}} \times 100$$

The results of the above tests are set forth in Table XIV below.

the method of preparation for these samples was the same as set forth in paragraph one of Example VII above. The amounts of reagents are set forth in Table XV below. The SMQ-Fe products were recovered by drum drying as in Example VII.

TABLE XV

|  | Sample No. | | |
| --- | --- | --- | --- |
|  | P | Q | R |
| Water, ml | 400 | 400 | 2,000 |
| NaOH (50%), ml | 40 | 40 | [1] 340 |
| NaSO₃CH₂OH, grams | 150 | 150 | 150 |
| Quebracho, grams | 200 | 200 | 200 |
| Ferrifloc, grams | 28 | 140 |  |
| FeCl₃.6H₂O, grams |  |  | [2] 350.4 |
| Mols Fe/monomer mol of quebracho | 1/6 | 5/6 | 2 |

[1] Added in two portions, 40 ml. after the NaSO₃CH₂OH and 300 ml after the FeCl₃.6H₂O.
[2] Added in 700 ml. of water.

Samples of the SMQ-Fe additives were then blended into a base mud to prepare drilling mud samples which were tested as set forth in Example VII above. Results of these tests are set forth in Table XVI below.

TABLE XVI.—SMQ-FE ADDITIVES IN BASE MUD NO. 4 (20 WT. PERCENT KAOLIN AND 4 WT. PERCENT BENTONITE IN WATER, PLUS SUFFICIENT BARITES [1] TO GIVE MUD WEIGHT OF 12.2 LBS./GAL.)

|  | Base Mud [2] | Run Number | | | Base Mud [3] |
| --- | --- | --- | --- | --- | --- |
|  |  | 1 | 2 | 3 |  |
|  |  | SMQ-Fe | SMQ-Fe | SMQ-Fe |  |
| Additive: |  |  |  |  |  |
| Sample No |  | P | Q | R |  |
| Lbs./bbl. mud | 0 | 10 | 10 | 10 | 0 |
| Initial Properties: |  |  |  |  |  |
| Plastic viscosity, cps | 39 | 37 | 65 | 38 | 30 |
| Yield point, lbs./100 ft.² | 62 | 23 | 85 | 15 | 34 |
| Initial gel, lbs./100 ft.² | 38 | 12 | 18 | 12 | 36 |
| 10-min. gel, lbs./100 ft.² | 75 | 21 |  |  | 73 |
| Water loss, ml./30 min | 8.5 | 5.4 | 3.0 | 8.7 | 10.2 |
| pH | 8.2 | 9.2 | 9.1 | 9.0 | 8.4 |
| After Aging 3 days at 350° F.: |  |  |  |  |  |
| Plastic viscosity, cps | 34 | 74 | 39 | 41 | 41 |
| Yield point, lbs./100 ft.² | 33 | 22 | 9 | 18 | 79 |
| Initial gel, lbs./100 ft.² | 115 | 4 | 3 | 11 | 63 |
| 10-min. gel, lbs./100 ft.² | 166 | 20 | 11 | 38 | 122 |
| Water loss, ml./30 min | 10.2 | 7.0 | 8.8 | 9.6 | 12.5 |
| pH | 8.0 | 8.5 | 8.0 | 8.3 | 8.1 |
| Shear Strength, lbs./100 ft.² | 500 | 320 | 140 | 475 | 600 |

[1] Commercial product from Baroid Division, National Lead Co.
[2] For Runs 1 and 2.
[3] For Run 3.

TABLE XIV

|  | Run Number | | | | | | |
| --- | --- | --- | --- | --- | --- | --- | --- |
|  | 1 | 2 | 3 | 4 | 5 | 6 | 7 |
| SMQ-Fe additive, lbs./bbl. H₂O | 0 | 1 | 2 | 4 | 6 | 8 | 12 |
| Swelling Index: |  |  |  |  |  |  |  |
| 176° F | 100 | 52 |  | 42 | 58 | 49 | 42 |
| 300° F | 100 | 61 | 54 | 38 | 32 |  |  |

The above data show that additives of the invention definitely possess a clay swelling inhibitor action, and this action is maintained at elevated temperatures. This is another outstanding advantage of said additives and is very valuable when drilling a so-called "heaving shale."

*Example IX*

Three additional samples of SMQ-Fe additive in accordance with the invention were prepared. In general, The metal complexes of sulfoalkylated tannin of the invention can be used in a wide variety of aqueous drilling fluids, e.g., water base drilling fluids and oil-in-water emulsion drilling fluids. In some wells, particularly where hard limestone formations containing no shale or clay are being drilled, the drilling fluid can be water containing only a very small amount of finely divided inorganic solids such as clay solids. Many times the drilling of a well is started with water as the drilling fluid. As the drilling progresses and shales or clay formations are penetrated, the circulating water will pick up natural clays and become what is commonly referred to as a drilling mud or drilling fluid. In such instances the natural clays can constitute as much as 40 percent by weight of the drilling fluid. More frequently, however, it is desirable to prepare a drilling fluid which is to be used in the drilling by mixing a clayey material such as a natural clay or bentonite with water. If a drilling fluid is thus prepared, the concentration of the clayey material is usually lower, generally constituting from about 1 to about 25 weight percent of the entire composition. Thus, the drilling fluids of the invention in which the metal complexes of the invention are utilized can contain only relatively small amounts of said clayey materials or can contain said clayey materials in amounts up to about 40 weight percent of the entire composition.

The finely divided inorganic solids used in the drilling fluids increase the viscosity and afford plastering properties to said fluids by aiding the formation of a filter cake on the wall of the bore hole and thus aid in reducing fluid loss to the formations penetrated by said bore hole. While the presence of said solids is desirable initially, it should be pointed out that the drilling fluids of the invention are operable without the initial addition of said solids because a certain solids content will develop during the drilling. The finely divided inorganic solids used in the practice of the invention should be insoluble in the oil phase as well as insoluble in the water phase so that they will remain undissolved over long periods of time. Examples of finely divided solids suitable for use in the practice of the invention include, among others, the following: bentonite, ground limestone, barites, ground oyster shells, diatomaceous earth, Fuller's earth, kaolin, attapulgite, McCracken clay, and other native and/or treated clays. Mixtures of two or more of said finely divided solids can also be used. Some of said materials such as barites and limestone are used primarily as weighting agents. All of said materials are preferably ground until at least about 90 percent with pass through a 325-mesh screen.

A preferred drilling fluid for some drilling operations is an oil-in-water emulsion drilling fluid. These drilling fluids can also contain clay or clayey materials in concentrations ranging from small amounts up to about 40 weight percent. Said oil-in-water emulsion drilling fluids are usually distinguished from water base drilling by their content of from 5 to 40, preferably 5 to 25, weight percent of oil. However, there is really no sharp dividing line between water base drilling fluids and oil-in-water emulsion drillng fluids because water forms the continuous phase in both. Both are frequently referred to as aqueous drilling fluids. Thus, herein, and in the claims, unless otherwise specified, the term "aqueous drilling fluid" is used generically and refers to both water base drilling fluids and oil-in-water emulsion drilling fluids.

In an oil-in-water emulsion drilling fluid, the principal value of the oil is as an aid in controlling the density of the drilling fluid and its fluid loss properties. Oils which can be used in the practice of the invention are usually petroleum oils, although other oleaginous materials such as vegetable and animal oils can be used, though seldom with economic advantage. The oils in any event should contain at least some material boiling above the gasoline boiling range, i.e., above about 400° F. at atmospheric pressure. Oils with too high a content of highly volatile hydrocarbons in the gasoline boiling range are undesirable because of the danger of fire, and because of the low viscosity. It is preferred that the oil have a flash point above about 140° F. Examples of suitable oils which can be employed in the practice of the invention include, among others, the following: topped crude oil, gas oils, kerosene, diesel fuels, heavy alkylates, fraction of heavy alkylates, and the like. The more preferred oils are predominently paraffinic in character since these are less detrimental to rubber components in pumps, lines, etc. It is preferred that the oil have a gravity within the range of 15–40° API.

The aqueous drilling fluids of the invention, both the water base drilling fluids and the oil-in-water emulsion drilling fluids, can contain other additives when required to adjust the properties of the drilling fluids in accordance with conventional practice. Thus, it will be understood that other additives can be added to the drilling fluids of this invention without departing from the scope of the invention. Special materials are oftentimes added to drilling fluids for particular purposes, and such additional materials can be employed in the drilling fluids of this invention, providing a usual and conventional test indicates a lack of obvious adverse reactions, and such additional additives are applicable in the drilling fluids of this invention with few, if any, exceptions.

An important advantage of the metal complex additives of the invention is the ease with which they can be dispersed in water or in the water phase of the drilling fluid. Said metal complexes can be incorporated in the drilling fluids by merely adding same to a stream of the circulating drilling fluid. Said metal complexes are easily pulverized solids which can be added directly as such to the jet hopper commonly employed in formulating drilling fluids. The incorporation of said metal complexes into the drilling fluid can be either before or during the drilling of the well. Thus, said metal complexes of the invention can be incorporated in the drilling fluid in any suitable manner.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. An aqueous well drilling fluid comprising a mixture containing water, sufficient suspended finely divided solids to form a filter cake on the wall of the well, and an amount of a metal complex of a sulfoalkylated tannin sufficient to reduce at least one of (a) the water loss due to filtration through said filter cake, (b) the yield point, and (c) the 10-minute gel of said drilling fluid, but insufficient to increase the viscosity of said drilling fluid to such an extent that it cannot be circulated, said metal complex having been prepared by the inter-reaction between a tannin compound selected from the group consisting of the gallotannins and the flavotannins, in an alkaline aqueous reaction medium at a temperature within the range of from 70 to 300° F. and in amounts based on 100 parts by weight of said tannin compound, from 1 to 60 parts by weight of a carbonyl compound selected from the group consisting of the lower molecular weight aldehydes and ketones, from 4 to 115 parts by weight of a sulfur compound selected from the group consisting of sulfurous acid and water-soluble salts thereof, and from 0.3 to 64 parts by weight of a metal selected from the group consisting of iron, copper, chromium, nickel, cobalt, manganese, zinc, aluminum, titanium, vanadium, and mixtures thereof, said metal being present in a compound selected from the group consisting of the hydroxides and the water-soluble salts of said metals.

2. An aqueous drilling fluid according to claim 1 wherein the amount of said metal complex in said drilling fluid is within the range of from 0.1 to 30 pounds per barrel of said drilling fluid.

3. An aqueous drilling fluid according to claim 1 wherein the amount of said metal complex in said drilling fluid is within the range of from 1 to 15 pounds per barrel of said drilling fluid.

4. An aqueous drilling fluid according to claim 2 wherein said metal is iron and the parts by weight thereof is within the range of from 6 to 20, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said iron compound is reacted with said sulfomethylated quebracho to form an iron complex of sulfomethylated quebracho.

5. An aqueous drilling fluid according to claim 1 wherein said metal is copper and the parts by weight thereof is within the range of from 6.5 to 21, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said copper compound is reacted with said sulfomethylated quebracho to form a copper complex of sulfomethylated quebracho.

6. An aqueous drilling fluid according to claim 1 wherein said metal is chromium and the parts by weight thereof is within the range of from 5.8 to 17, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said chromium compound is reacted with said sulfomethylated quebracho to form a chromium complex of sulfomethylated quebracho.

7. An aqueous drilling fluid according to claim 2 wherein said metal is aluminum and the parts by weight thereof is within the range of from 3 to 9, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said aluminum compound is reacted with said sulfomethylated quebracho to form an aluminum complex of sulfomethylated quebracho.

8. An aqueous drilling fluid according to claim 2 wherein said metal is zinc and the parts by weight thereof is within the range of from 6.7 to 22, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said zinc compound is reacted with said sulfomethylated quebracho to form a zinc complex of sulfomethylated quebracho.

9. In a process for the drilling of a well with well drilling tools wherein there is circulated in said well a drilling fluid, the improvement comprising circulating in said well in contact with the wall thereof an aqueous well drilling fluid comprising a mixture containing water, sufficient suspended finely divided solids to form a filter cake on the wall of the well, and to which drilling fluid there has been added an amount of a metal complex of a sulfoalkylated tannin sufficient to reduce at least one of (a) the water loss due to filtration through said filter cake, (b) the yield point, and (c) the 10-minute gel of said drilling fluid, but insufficient to increase the viscosity of said drilling fluid to such an extent that it cannot be circulated, said metal complex having been prepared by the inter-reaction between a tannin compound selected from the group consisting of the gallotannins and the flavotannins, in an alkaline aqueous reaction medium at a temperature within the range of from 70 to 300° F. and in amounts based on 100 parts by weight of said tannin compound, from 1 to 60 parts by weight of a carbonyl compound selected from the group consisting of the lower molecular weight aldehydes and ketones, from 4 to 115 parts by weight of a sulfur compound selected from the group consisting of sulfurous acid and water-soluble salts thereof, and from 0.3 to 64 parts by weight of a metal selected from the group consisting of iron, copper, chromium, nickel, cobalt, manganese, zinc, aluminum, titanium, vanadium, and mixtures thereof, said metal being present in a compound selected from the group consisting of the hydroxides and the water-soluble salts of said metals.

10. A process according to claim 9 wherein the amount of said metal complex in said drilling fluid is within the range of from 0.1 to 30 pounds per barrel of said drilling fluid.

11. A process according to claim 9 wherein said metal is iron and the parts by weight thereof is within the range of from 6 to 20, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said iron compound is reacted with said sulfomethylated quebracho to form an iron complex of sulfomethylated quebracho.

12. A process according to claim 9 wherein said metal is copper and the parts by weight thereof is within the range of from 6.5 to 21, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said copper compound is reacted with said sulfomethylated quebracho to form a copper complex of sulfomethylated quebracho.

13. A process according to claim 9 wherein said metal is chromium and the parts by weight thereof is within the range of from 5.8 to 17, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said chromium compound is reacted with said sulfomethylated quebracho to form a chromium complex of sulfomethylated quebracho.

14. A process according to claim 9 wherein said metal is aluminum and the parts by weight thereof is within the range of from 3 to 9, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said aluminum compound is reacted with said sulfomethylated quebracho to form an aluminum complex of sulfomethylated quebracho.

15. A process according to claim 9 wherein said metal is zinc and the parts by weight thereof is within the range of from 6.7 to 22, said tannin compound is quebracho extract, said carbonyl compound is formaldehyde and the parts by weight thereof is within the range of from 15 to 36, said sulfur compound is sodium bisulfite and the parts by weight thereof is within the range of from 35 to 65, and said metal complex is prepared by reacting said quebracho extract with said formaldehyde and said sodium bisulfite to form sulfomethylated quebracho, and said zinc compound is reacted with said sulfomethylated quebracho to form a zinc complex of sulfomethylated quebracho.

References Cited

UNITED STATES PATENTS

| | | | |
|---|---|---|---|
| 2,092,622 | 9/1937 | Koch et al. | 8—94.24 |
| 2,331,281 | 10/1943 | Wayne | 252—8.5 |
| 2,605,221 | 7/1952 | Hoeppel | 252—8.5 |
| 2,653,967 | 9/1953 | Monroe | 260—473.5 |
| 3,034,982 | 5/1962 | Monroe | 252—8.5 |
| 3,065,039 | 11/1962 | Komarek et al. | 8—94.24 |

FOREIGN PATENTS 2,603    1/1899    Great Britain.

LEON D. ROSDOL, *Primary Examiner.*

H. B. GUYNN, *Assistant Examiner.*